United States Patent
Mailliet et al.

(10) Patent No.: US 6,200,123 B1
(45) Date of Patent: *Mar. 13, 2001

(54) HYDRAULIC CLOSING UNIT

(75) Inventors: Pierre Mailliet, deceased, late of Redange/Attert; by Monique Mailliet, legal representative, Peppange; by Marc Mailliet, legal representative, Bettembaurge, all of (LU)

(73) Assignee: Husky Injection Molding Systems Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 08/981,543

(22) PCT Filed: Jun. 10, 1996

(86) PCT No.: PCT/EP96/02508

§ 371 Date: Apr. 27, 1998

§ 102(e) Date: Apr. 27, 1998

(87) PCT Pub. No.: WO96/41712

PCT Pub. Date: Dec. 27, 1996

(30) Foreign Application Priority Data

Jun. 12, 1995 (LU) .......................................... 88624

(51) Int. Cl.[7] ................................................. B29C 45/67
(52) U.S. Cl. ........................ 425/150; 425/556; 425/589; 425/595; 425/451.9
(58) Field of Search .................................. 425/150, 556, 425/589, 595, 451.9

(56) References Cited

U.S. PATENT DOCUMENTS

| | | | |
|---|---|---|---|
| 4,304,540 | * 12/1981 | Hammon | 425/595 |
| 4,504,208 | * 3/1985 | Kurumaji et al. | 425/595 |
| 4,874,309 | * 10/1989 | Kushibe et al. | 425/595 |
| 5,135,385 | * 8/1992 | Fukuzawa et al. | 425/595 |
| 5,192,557 | * 3/1993 | Hirata et al. | 425/595 |
| 5,338,171 | * 8/1994 | Hayakawa et al. | 425/595 |
| 5,417,913 | 5/1995 | Arend | 264/328 |
| 5,645,875 | * 7/1997 | Glaesener et al. | 425/589 |
| 5,853,773 | * 12/1998 | Choi | 425/150 |

FOREIGN PATENT DOCUMENTS

| | | |
|---|---|---|
| 0513572 | 11/1992 | (EP) . |
| 1299781 | 12/1972 | (GB) . |
| 2064415 | 6/1981 | (GB) . |
| 61-199920 | 9/1986 | (JP) . |
| 5-24086 | 2/1993 | (JP) . |
| 93/16828 | 9/1993 | (WO) . |

* cited by examiner

*Primary Examiner*—James P. Mackey
(74) *Attorney, Agent, or Firm*—Fitzpatrick, Cella, Harper & Scinto

(57) ABSTRACT

A hydraulic closing unit has a ring-shaped hydraulic cylinder that generates a closing force, a locking bushing, an assisted drive for swivelling the locking bushing from a first angular position to a second angular position, and a pressure bar that extends through the hydraulic cylinder and the locking bushing in the axial direction. Outer teeth on the pressure bar and inner teeth in the locking bushing allow the pressure bar to be axially pushed through the locking bushing in the first angular position of the locking bushing, and an axial force to be transmitted in the second angular position of the locking bushing. The hydraulic cylinder is designed as a double action, ring-shaped compression cylinder. The piston of the hydraulic cylinder is secured against rotation and screwed by a rotary thread into the rotary locking bushing.

29 Claims, 10 Drawing Sheets

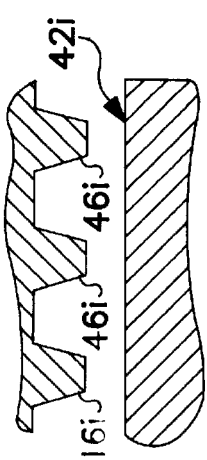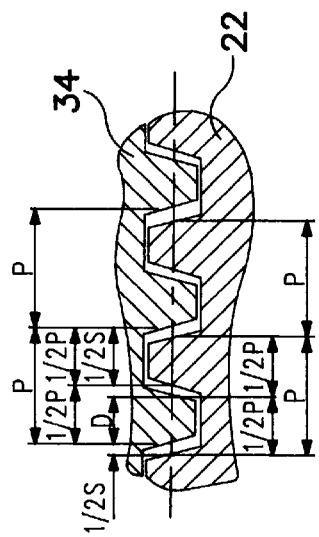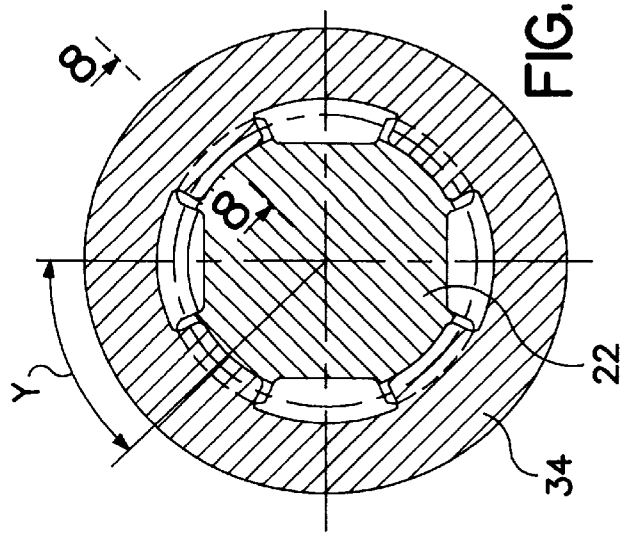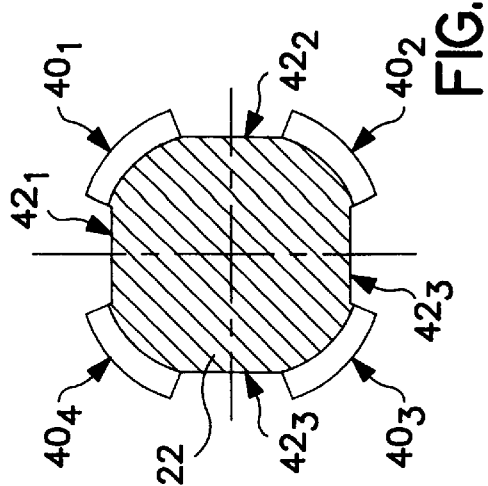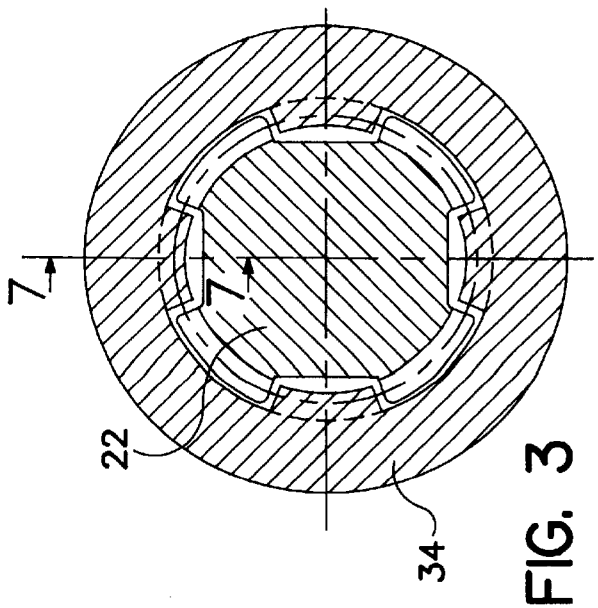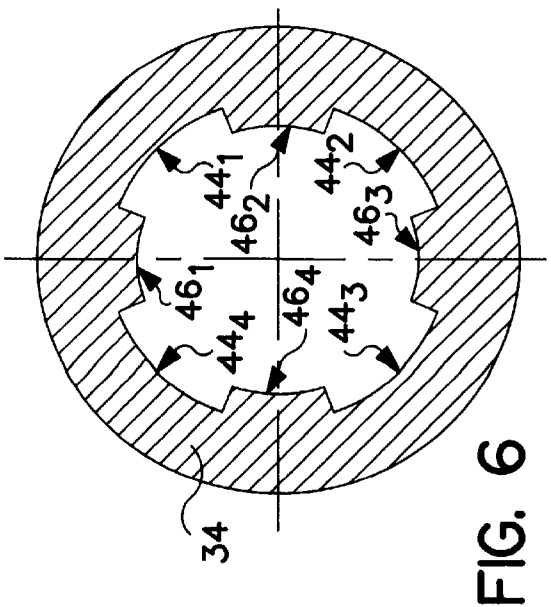

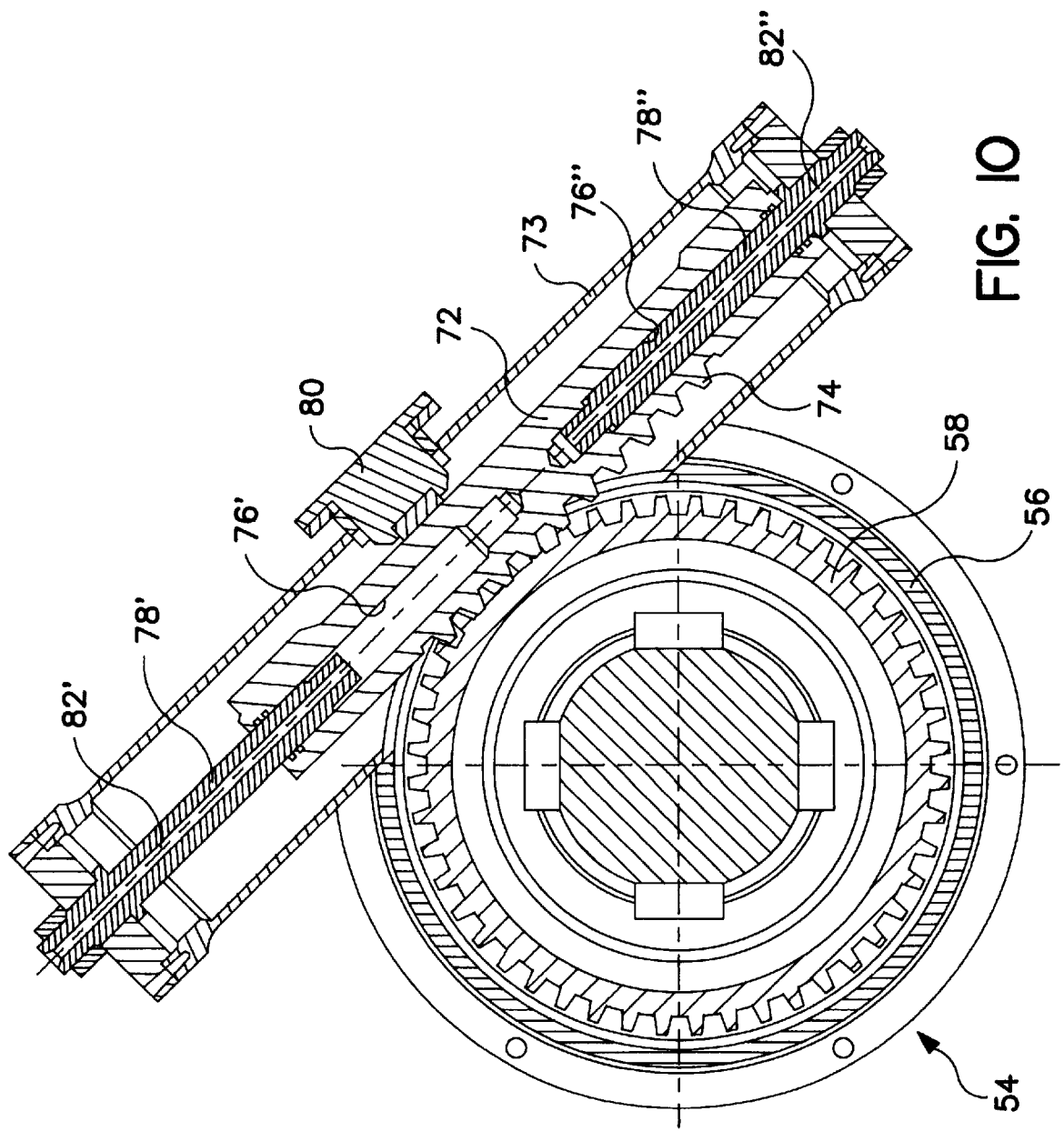

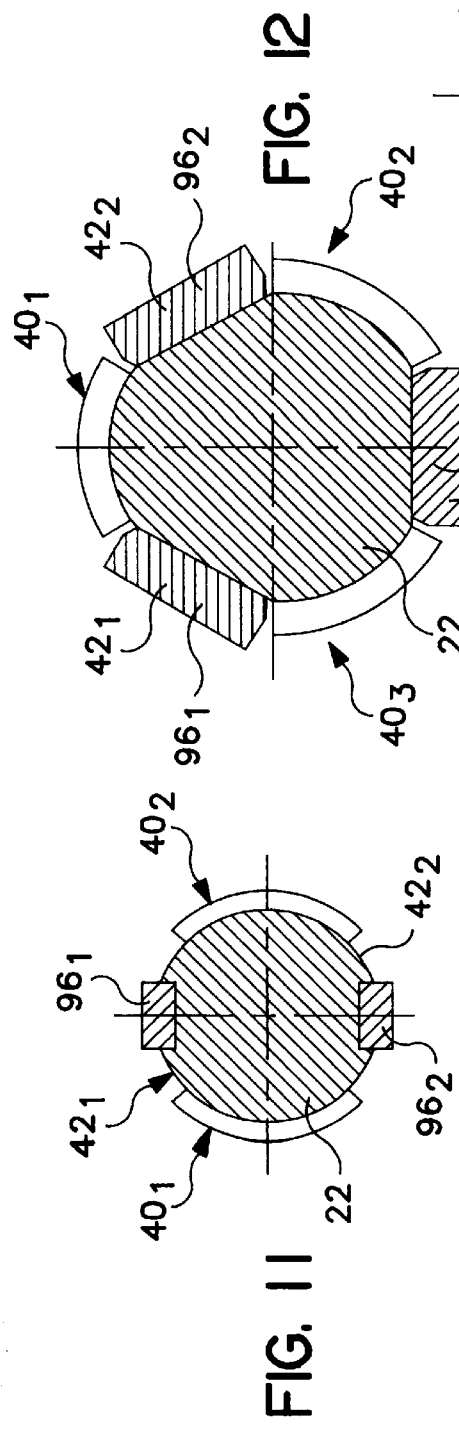
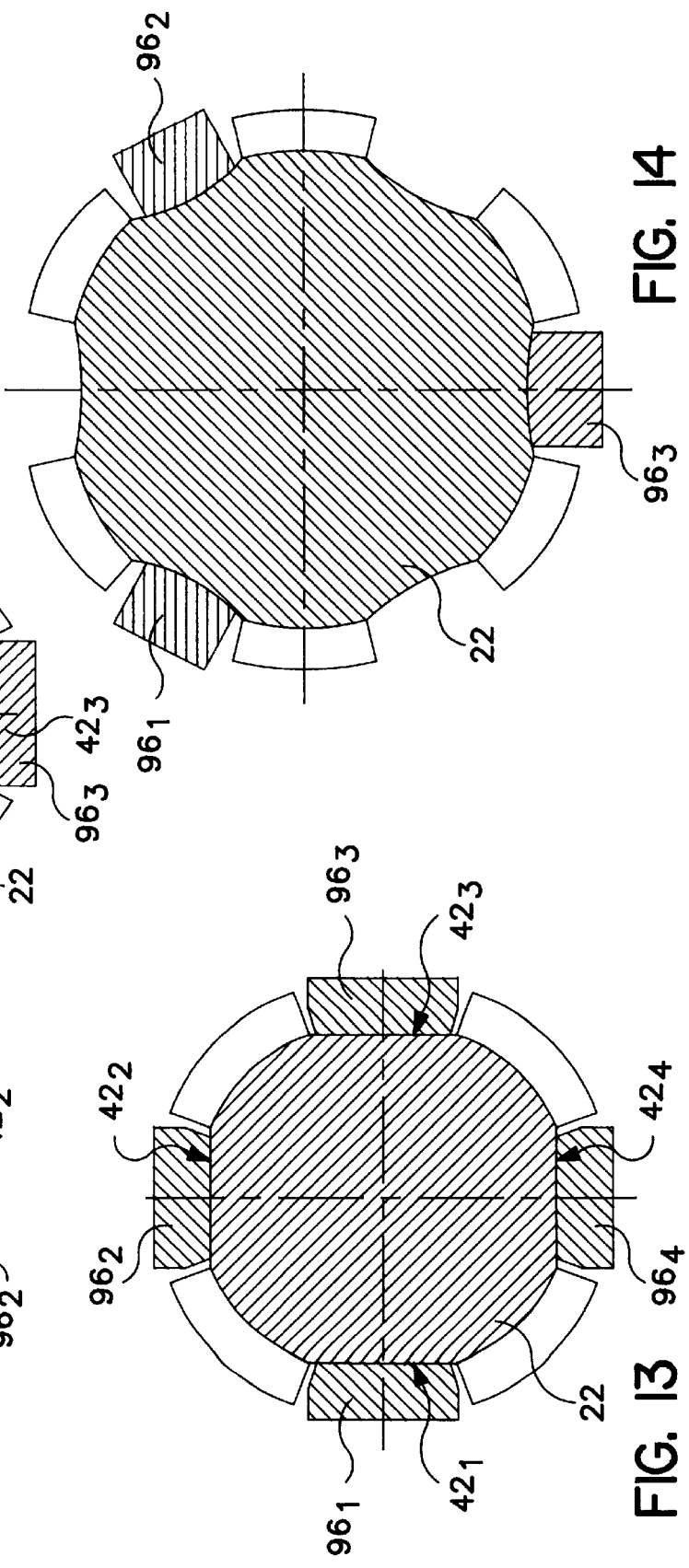

HYDRAULIC CLOSING UNIT

BACKGROUND OF THE INVENTION

1. Field of the Invention

The present invention relates to a hydraulic closing unit such as used, for instance, in injection molding machines.

2. Related Art

The closing unit of an injection molding machine receives the injection mold. It carries out the movements necessary for the closing and opening of the injection mold and produces the forces necessary for the locking and opening of the injection mold. The main components of each closing unit are a stationary plate on the injection side (hereinafter referred to as the injection plate), a movable closure plate, as well as a locking device. One part of the injection mold is clamped on the stationary injection plate while the complementary part of the injection mold is clamped on the movable closure plate. By locking device there is to be understood the device which, upon the injection, produces the necessary closing force for keeping the injection mold closed. Both mechanical locking devices with lever mechanisms and hydraulic locking devices with hydraulic cylinders are known. The present invention relates to a closing unit with hydraulic locking.

From International Patent Application WO-A-93/16828, a closing unit for an injection molding machine is known in which the movable closure plate can be displaced between the stationary injection plate and an end plate which is also stationary by two displacement cylinders. The movable closure plate is provided with a central push rod which is guided in an annular insert in the stationary end plate. On this end plate a force cylinder is arranged which has a single-acting annular piston passed through axially by the push rod. A locking ring is guided in a cylindrical guide tube which is screwed onto the end plate. If the force cylinder is acted on by pressure, the annular piston of the force cylinder is advanced in the direction towards the movable closure plate. The front surface of the annular piston thereby comes against the facing end surface of the locking ring, the latter being pushed axially in its cylindrical guide tube in the direction towards the movable closure plate. In order to lock the locking ring on the push rod, the push rod has an outer toothing and the locking ring has a complementary inner toothing. The inner toothing and the outer toothing are divided into several rows of teeth by longitudinal grooves. The locking ring can be turned into first and second angular positions by means of a positioning cylinder. In the first angular position, the rows of teeth of the outer toothing can be passed through axially by longitudinal grooves of the inner toothing and the rows of teeth of the inner toothing by longitudinal grooves of the outer toothing, so that the push rod slides without substantial resistance through the locking ring. In the second angular position, the tooth of the outer toothing, on the other hand, can engage behind the teeth of the inner toothing. In this position, the locking ring is locked on the push rod. The annular piston of the force cylinder can exert a pressing force on the push rod via the locking ring and thus transmit the necessary closing force to the movable closure plate.

Upon the opening of the mold, the locking ring initially remains locked to the push rod. The two displacement cylinders produce a short rearward stroke in order to open the mold. By this short rearward stroke, the locking ring and the annular piston are moved backward simultaneously. Thereupon, the lock between the push rod and the locking ring is opened so that the push rod can slide through the locking ring when the closure plate is pulled back at high speed by the two displacement cylinders.

It may be emphasized that it would be desirable to produce the opening force for the opening of the injection mold also by the force cylinder. However, this is not possible in a closing unit in accordance with WO-A-93/16828 since the force cylinder is designed as a single-acting cylinder and furthermore it cannot be seen how a pulling force can be transferred in a simple manner from the piston via the turnable locking ring to the push rod.

SUMMARY OF THE INVENTION

The object of the present invention is therefore to create a closing unit in which the closing and opening forces are produced by the sane hydraulic cylinder. This object is achieved by a closing unit in accordance with claim 1.

The solution in accordance with the invention consists essentially therein that the force cylinder is developed as a doubling annular pressure cylinder having a first pressure chamber for producing an closing force and a second pressure chamber for producing an opening force, the piston of this hydraulic force cylinder being secured against turning and coupled by a screw thread to the locking bushing. In this way, both a pressing force and a pulling force can be transmitted from the piston which is fixed against rotation via the rotatable locking bushing to the push rod, and thus to the closure plate. The screw thread is a simple, extremely compact, and low-stress solution for turnably connecting together the piston and the locking bushing. By turning the locking bushing from the first angular position into the second angular position, the locking bushing naturally experiences an advance X relative to the piston. However, this is not disturbing since this advance can even be used in an extremely advantageous manner in order to distribute the axial play between the inner toothing and the outer toothing which is necessary for their engagement in such a manner that inner toothing and outer toothing already lie substantially without play against each other prior to the transmission of the force.

In order to assure a dependable engagement of the inner toothing into the outer toothing, a relatively large axial flank clearance should actually be present upon the engagement. A large flank clearance, however, also has substantial disadvantages. Thus, for instance, the operating stroke of the force cylinder is increased, and thus the consumption of energy of the closing unit. The flows through the force cylinder are considerably greater, so that the hydraulic system of the closing unit must also be designed larger. Furthermore, the locking bushing is relatively strongly accelerated upon overcoming a large flank clearance, so that the teeth of the inner toothing strike with great momentum against the outer toothing.

WO-A-93/16828 proposes developing the outer toothing on the push rod and the inner toothings in the locking ring as a thread, the disturbing flank clearance, in accordance with WO-A-93/16828, being eliminated by the turning of the locking ring. However, this means that the toothing necessarily has, in the direction of rotation of the locking ring, a negative pitch in the direction of the force to be transmitted, and that furthermore, the pitch of this thread is necessarily determined by the flank clearance and the angle of rotation of the locking ring. In this way, the designer, however, is subjected to substantial constraints in development with respect to the toothings, which constraints, for instance, prevent functionally correct, load-resistant optimizing of the toothings in many cases.

In accordance with the present invention, it is unimportant whether the teeth of the inner and outer toothings are arranged annularly, or helically with positive pitch or helically with negative pitch. The advance produced by the screw thread upon the turning of the locking bushing permits in each case the axial flank clearance S to be distributed between inner toothing and outer toothing in such a manner that, in the locked position between the tooth flanks which are to transmit the force, no substantial axial flank clearance is present any longer. If, furthermore, the actuator for the turning of the locking bushing is so designed that it can place the locking bushing into a second angular position both by counterclockwise rotation and by clockwise rotation, then the flank clearance S between the inner and outer toothings is distributed on the one hand on the left side and on the other hand on the right side depending on direction of rotation. The toothings are accordingly automatically free of clearance for the transmission of the closing force in the first direction of turning and automatically free of clearance for the transmission of the opening force to the closing plate in the second direction of turning.

One very advantageous embodiment of the actuator will be described inter alia in the following detailed description.

BRIEF DESCRIPTION OF THE DRAWINGS

Embodiments, as well as various features and advantages, of the invention will be described in detail with reference to the figures of the accompanying drawings, in which:

FIGS. 3 and 4 are a cross section through a push rod and a locking bushing of the closing unit of FIG. 1;

FIG. 5 is a cross section through the push rod;

FIG. 6 is a cross section through the locking bushing;

FIG. 7 is a section along the section line A—A of FIG. 3;

FIG. 8 is a section along the section line B—B of FIG. 4;

FIG. 10 is a section through an actuator for the locking bushing;

FIGS. 11 to 14 are cross sections through different embodiments of the push rod;

DETAILED DESCRIPTION OF THE PRESENTLY PREFERRED EXEMPLARY EMBODIMENTS

Figure 1:
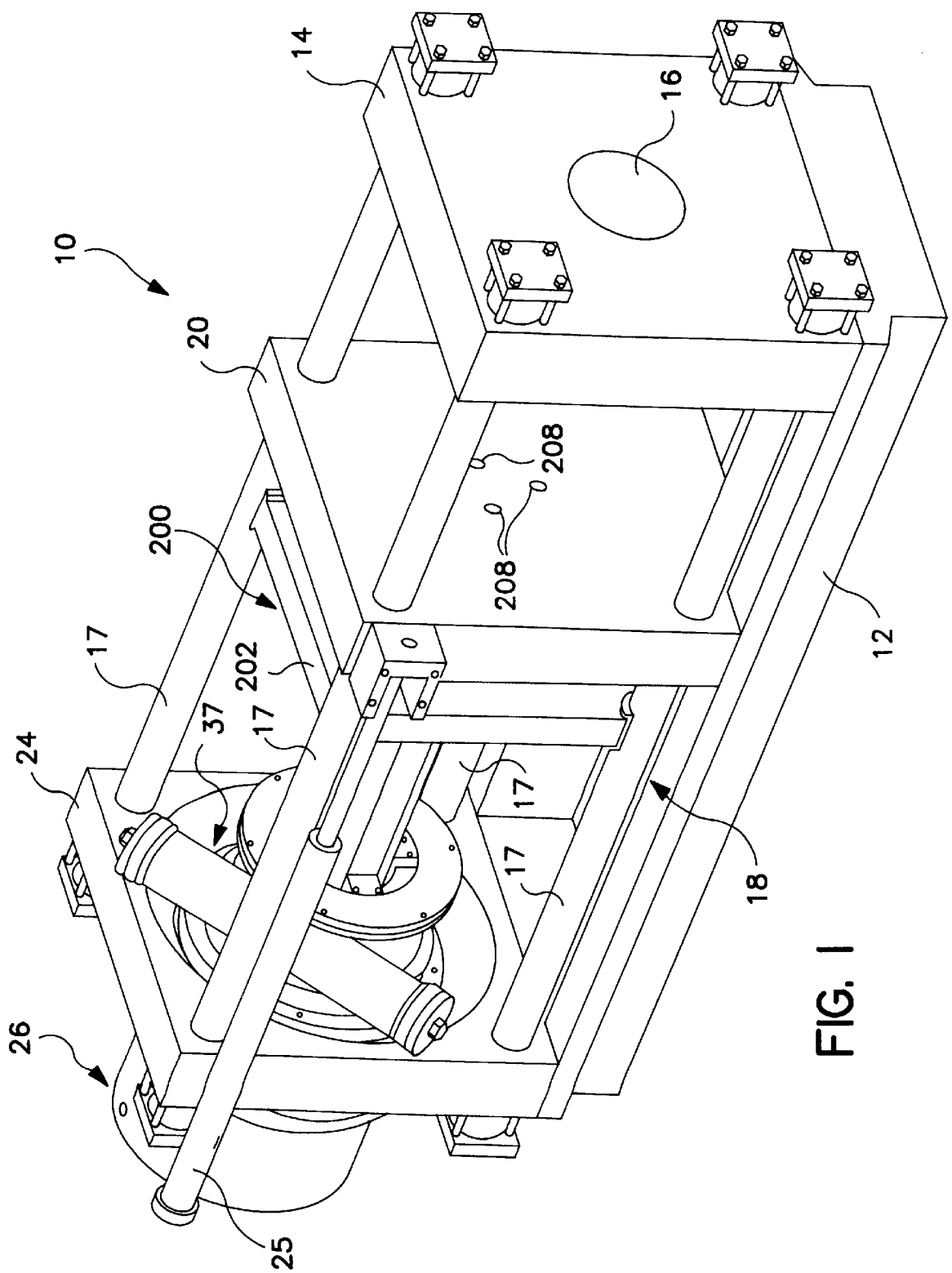
FIG. 1 is a view of closing unit in accordance with the invention.
Figure 2:
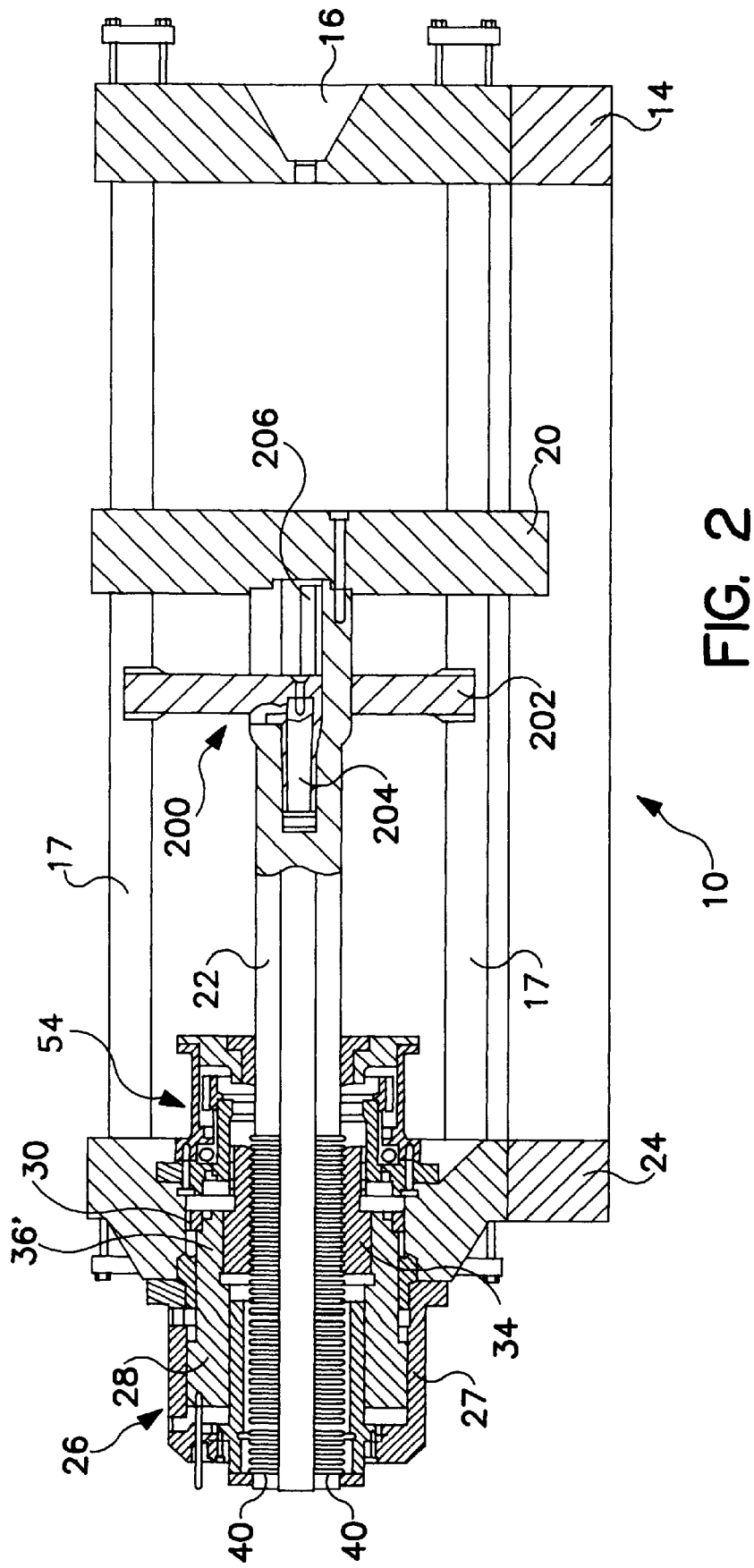
FIG. 2 is a longitudinal section through the closing unit of FIG. 1.

The general construction of a closing unit 10 in accordance with the invention will be xplained with reference to FIGS. 1 and 2, which show a hydraulic closing unit of an injection molding machine. An injection plate 14 having a central injection opening 16 for the injection head of the injection molding machine is rigidly mounted on a base 12. Four columns 17 connect the four corners of the injection plate 14 mechanically to the four corners of an end plate 24 which is mounted, also rigidly, on the other end of the base 12. The base 12 forms a guide bed 18 for a movable closure plate 20. The complementary halves of an injection mold (not shown) are clamped onto the injection plate 14 and the closure plate 20.

The movable closure plate 20 is displaceable on the guide bed 18 via a displacement device which comprises, for instance, laterally arranged displacement cylinders 25. This displacement device 25 has the task of moving the complementary halves of the mold together and apart with relatively high speed by displacement of the closure plate 20 relative to the injection plate 14. It will be noted that the housing of the displacement cylinder 25 is fastened on the stationary end plate 24 so that the displacement cylinders 25 can have a rigid hydraulic connection on the fixed end plate 14.

A push rod 22 extends from the movable closure plate 20 through the stationary end plate 24. The push rod 22 is rigidly fastened to the closure plate 20. On the stationary end plate 24, a force cylinder 26 is associated with the push rod 22, the housing 27 of the cylinder being rigidly attached to the end plate 24. In FIG. 2 and in FIG. 9 it can be seen that this force cylinder 26 comprises an annular piston 28. This annular piston 28 is secured against turning, for instance by a lengthwise spline 30 in a longitudinal groove. A locking bushing 34 is mechanically connected for rotation with the annular piston which is fixed against rotation. In particular, the locking bushing 34 can be coupled for turning via a thread 36 (hereinafter called the screw thread 36) to the annular piston 28; it can, for instance, be threaded by means of the screw thread 36 into the free end of the annular piston 28. An actuator 37 permits the locking bushing 34 to turn in two directions and thus adjust its angular position relative to the push rod 22.

An outer toothing 40 is provided on the push rod 22 along the rear section of the rod. The locking bushing 34 has an inner toothing 46 on its inner side. This outer toothing and inner toothing are developed complementary to each other, in such a manner that in a first angular position of the turnable locking bushing 34, the push rod 22 can be passed axially through the locking bushing 34 and that in at least one second angular position, the inner toothing 46 of the locking bushing 34 engages into the outer toothing 40 of the push rod for the transmission of an axial force. In the first angular position of the locking bushing 34, the push rod 22 can accordingly slide, without substantial resistance axially through the annular piston 28 of the hydraulic cylinder 26. In its second angular position, on the other hand, the locking bushing 34 which is screwed onto the annular piston 28 can transmit considerable force to the push rod 22.

The force cylinder 26 has within its housing 27 a first pressure chamber 30 in which the annular piston 28 forms a front-side pressure surface. If, after locking the locking bushing 34 onto the push rod 22, the first pressure chamber is placed under pressure, then the annular piston 28 exerts a closing force on the closure plate 20 via the locking bushing 34 which is locked on the push rod 22.

In a second pressure chamber 31 of the housing 27, the annular piston 28 forms a substantially smaller pressure surface as shoulder surface. If this second pressure chamber 31 is placed under pressure and the first pressure chamber relieved, the annular piston 28 exerts, via the locking bushing 34 locked on the push rod 22, an opening force in the direction opposite the closing force described above, on the closure plate 20. This opening force serves to open the injection mold after the molding.

For the bringing together of the mold halves by displacement of the closure plate 20 by means of the displacement cylinders 25, the locking bushing 34 is in the first angular position. In this first angular position, the push rod 22 slides axially through the locking bushing 34 upon the displacement of the closure plate 20. When the closure plate has reached its end position, the locking bushing 34 is locked on the push rod 22 by turning into the second angular position. The force cylinder 26 can now transmit the required closing force via the push rod 22 to the closure plate 20.

One advantageous further embodiment of the locking means will be described in further detail with reference to FIGS. 2 to 8. The locking means on the push rod 22 advantageously comprise (see FIGS. 2 and 5) an outer toothing 40 which is divided by longitudinal grooves 42 into, for instance, four axial rows of teeth $40_1$, $40_2$, $40_3$, $40_4$. In these rows of teeth $40_1$, $40_2$, $40_3$, $40_4$, the teeth of the outer toothing are arranged in each case parallel to and at equal distance from each other. The locking bushing 34 (see FIGS. 9 and 6) comprises a complementary inner toothing, which is also divided by longitudinal grooves $44_1$, $44_2$, $44_3$, $44_4$ into three axial rows of teeth $46_1$, $46_2$, $46_3$, $46_4$. The longitudinal grooves $42_i$ in the outer toothing of the push rod 22 are somewhat wider than the tooth $46_i$ of the locking bushing 34, and the longitudinal grooves $44_i$ in the inner toothing of the locking bushing 34 are somewhat wider than the teeth $40_i$ of the push rod 22.

In a first angular position of the push rod, shown in FIG. 3, the teeth $46_i$ of the outer toothing of the rack (sic) 22 lie in the longitudinal grooves $44_i$ of the locking bushing 34. In this angular position the push rod 22 can be pushed through the locking bushing 34, the teeth $40_i$ of the outer toothing being guided by the longitudinal grooves $44_i$ of the inner toothing and the teeth $46_i$ of the inner toothing being guided by the longitudinal grooves $42_i$ of the outer toothing. FIG. 7 shows, in a cross section along the section line A—A of FIG. 3, the teeth of the inner toothing in the longitudinal grooves of the outer toothing.

In a second angular position—see FIG. 4—after the turning of the locking bushing 34 by an angle γ=180°/n (n=number of longitudinal grooves or of rows of teeth), the teeth $46_i$ of the locking bushing 34 are located axially between the teeth $40_i$ of the push rod 22. In this second angular position, therefore, the rows of teeth of the inner toothing engage into the rows of teeth of the outer toothing for the transmission of the necessary closing force.

FIG. 8 shows a section along the section line B—B of FIG. 4. It can be seen that the teeth of the outer and inner toothings have a trapezoidal cross section. The toothings can be developed helically, i.e. the teeth arranged along a helical line, and the toothings accordingly form a thread having a pitch P. The toothings can, however, also be annular, i.e. the teeth can form parallel rings which are arranged in each case at a distance P apart (also called pitch P).

In order that the inner toothing can engage into the outer toothing upon the turning of the locking bushing 34, the teeth $46_i$ of the inner toothing must, of course, be axially between the teeth $40_i$ of the outer toothing in the first angular position of the locking bushing 34. In order that small errors in position of the movable closure plate 20 do not prevent engagement of the inner toothing into the outer toothing, a relatively large axial flank clearance is desired between the inner toothing and the outer toothing.

From FIG. 8 it can be seen that P=2D+S in which:
P=pitch;
D=average tooth width;
S=axial flank clearance.

In practice, it has proven to be advantageous for S to be equal to 0.5 D, and therefore P to be equal to 2.5 D.

The locking bushing 34 transmits extremely high closing forces via the push rod 22 to the movable closure plate 20. In addition, the frequency in actual practice of the closings and openings is very high. The material of the locking bushing and of the push rod is accordingly subject to substantial static and dynamic loads. This can lead to permanent deformations of the toothings which impair the function of the locking device. In order to reduce the negative effects of such permanent deformations on the locking function, the following measures can advantageously be taken:

a) The locking bushing 34 is so fastened to the piston 28 that it is under compressive stress upon transmission of the very high closing force to the push rod 22. In this way, the result is obtained that the push rod 22 and the locking bushing 34 are deformed similarly.

b) The cross sections of the locking bushing 34 and the push rod 22 should be such that, upon transmission of the closing force, they are subjected to approximately the same maximum stresses, i.e. their minimum cross section should, if possible, be of the same size.

c) With the same tooth geometry, the base of the teeth of the outer toothing should be approximately equal to the base of the teeth of the inner toothing so that the stress maxima at these critical places are approximately the same. This means, for instance, the arc length (in degrees) of the teeth of the outer toothing is greater than the arc length of the teeth of the inner toothing.

d) The teeth of the outer toothing should be of a greater hardness than the teeth of the inner toothing. In addition, the flank surface of the teeth of the outer toothing should be larger than the flank surface of the teeth of the inner toothing so that an imprint of the teeth of the outer toothing on the softer teeth of the inner toothing is avoided.

e) The elastic limit of the push rod 22 should be about 20% higher than the elastic limit of the locking bushing 34. In this way, in combination with measures b) and c), the result is obtained that plastic deformations occur, in particular, on the locking bushing 34 and less so on the push rod 22. Plastic deformations on the push rod 22 are far more disturbing, since they namely destroy the axial homogeneity of the outer toothing, which can lead to inaccuracies in the positioning of the closure plate 20 if different size molds are used. Furthermore, the replacement of the push rod 22 is far more expensive than the replacement of the locking bushing 34.

It should be pointed that measures a), b) and c) of the above enumeration have advantageous effects on the distribution of force also in the normal case of elastic deformation. The elastic deformation of the locking bushing and the elastic deformation of the push rod are caused by these measures to take place in the sale direction and be of the same order of magnitude so that the force to be transmitted is distributed uniformly over all interangaging teeth of the outer and inner toothings.

In the description of FIG. 8, it was pointed out that substantial flank clearance has the advantage that small inaccuracies in the positioning of the closure plate 20 do not prevent engagement of the inner toothing of the locking bushing 34 into the outer toothing of the push rod 22. However, a substantial axial flank clearance also has essential disadvantages. First of all, the relatively small force stroke of the piston 28 in the case of large flank clearance S increases percentually more, as a result of which the consumption of oil and energy of the force cylinder becomes greater. Secondly, with large flank clearance S, the locking bushing 34 is imparted a high acceleration when acted on with pressure by the force cylinder 28, so that the teeth of the inner toothing strike strongly against the teeth of the outer toothing. For this reason it is advantageous to reduce or eliminate the flank clearance in the direction of the transmission of force.

In the present invention, the reduction in play or elimination of play in the direction of the transmission of force takes place automatically. Since the locking bushing 34 is connected via the screw thread 36 with the annular piston 28 and the latter is secured against turning, the locking bushing 34 will experience an advance $X=(\gamma/345°)P'$ relative to the annular piston 28 if it is turned by an angle $\gamma$, $P'$ being the pitch of the screw thread 36.

The turning of the locking bushing 34 is effected via a turning device 54 which is driven by the actuator 37. This turning device 54 comprises a housing 56 which is, for instance, flanged onto the end plate 24. A toothed bushing 58 is arranged, turnable in a ball bearing 60, within the housing 56. The toothed bushing 58 is placed on the free and of the locking bushing 34 and so connected with such end via a tooth or spline-shaft connection that a moment of rotation is transmitted in form-locked manner, but that at the same time an axial displacement of the locking bushing 34 in the toothed bushing 58 is possible. The angular position of the toothed bushing, and thus the angular position of the locking bushing 34, can be adjusted via the actuator 37 (see also FIG. 10) which engages into the outer toothing 64 of the toothed bushing 58. It should be pointed out that a pure moment of rotation is transmitted to the locking bushing 34. All radial forces which act on the toothed bushing 58 are transmitted directly by the ball bearing 60 to the housing 56. In this way assurance is had that the screw thread 36 is not stressed further by setting forces.

FIG. 10 shows an advantageous development of an actuator 37 for the turning device 54. This actuator 37 comprises a rack 72, the toothing 74 of which can mesh in the toothed bushing of the turning device 54. The rack 72 is arranged in a housing tube 73. In each nd of the rack 72 there is a cylindrical bore 76', 76". Pistons 78', 78" are introduced, sealed off, into the respective cylinder bores 76', 76". These pistons 78', 78" are advantageously developed as plunger pistons and are flanged axially onto the two ends of the housing tube 73. The rack 72 is displaceable back and forth axially in the housing tube 73 between the two pistons 78', 78". A guide shoe 80 takes up the radial forces of reaction which are transmitted by the toothed bushing 58 to the rack 72. In FIG. 10 the rack is shown resting against the right-hand piston 78'.

Both pistons 78', 78" have an axial connecting channel 82', 82" for a pressure fluid. Via these connecting channels 82', 82", the cylinder bores 76', 76" can be acted on optionally with the pressure fluid behind the piston 78', 78" so that two oppositely acting pressure cylinders are developed for the displacement of the rack 72. It should be pointed out that the actuator is so designed that the push rod 22 can be turned in each case to the right and to the left out of the first angular position.

Figure 9:
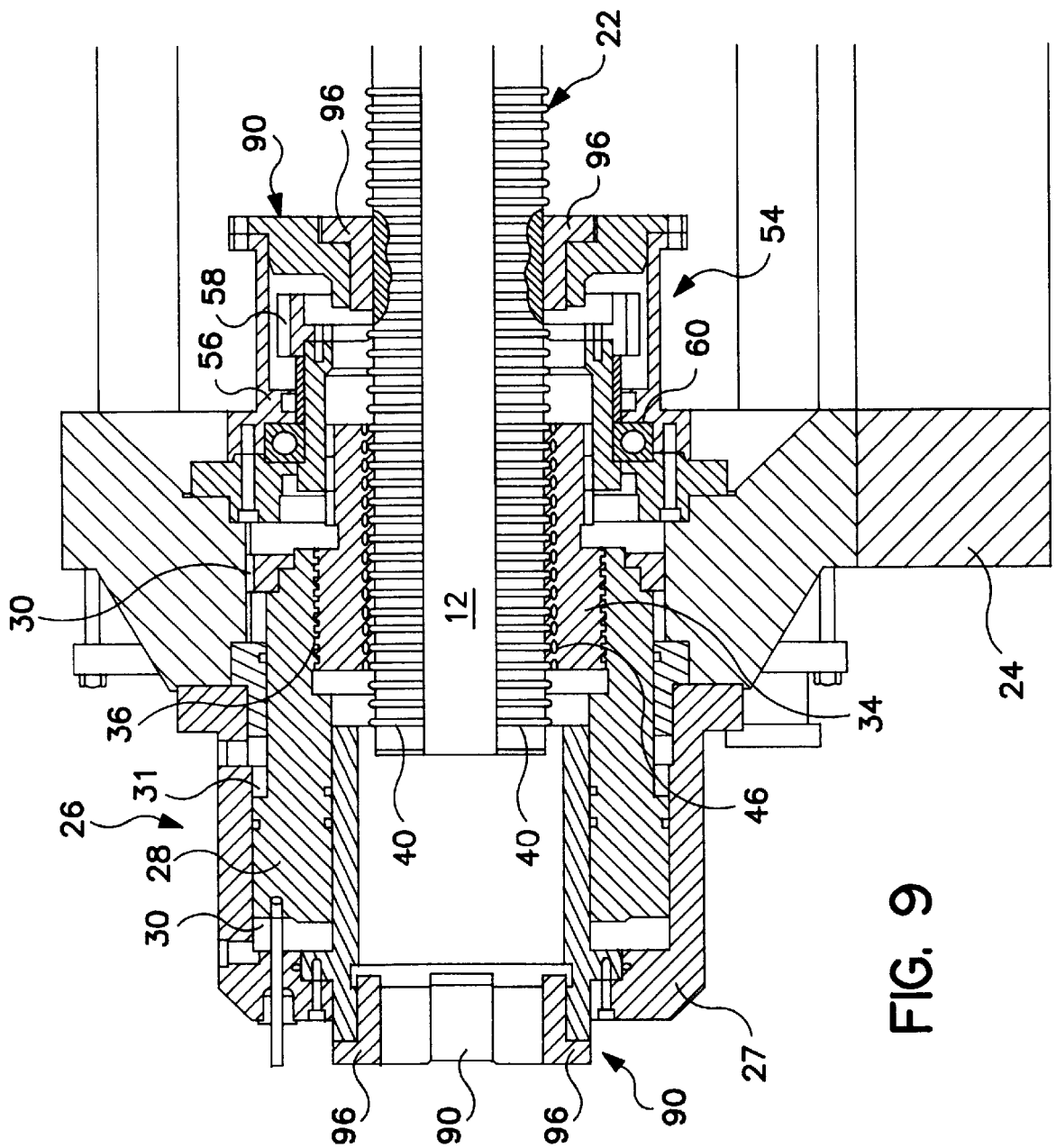
FIG. 9 is an enlargement from the longitudinal section of FIG. 2.

From FIG. 9 it can be seen that both an the entrance side on the housing 56 of the rotary drive 54 and on the housing 27 of the force cylinder, an axial guide device 90 for the push rod 22 is provided. Each of these guide devices 90 comprises four slide shoes 96. The four longitudinal grooves 42 on the push rod 22 are developed as guide surfaces for these slide shoes 96 and are extended beyond the rod section having the outer toothing. The push rod 22 is centered in the locking bushing by these two guide devices 90.

FIGS. 11 to 14 show various embodiments of a push rod 22 as well as various arrangements of the slide shoes 96 and embodiments of the guide surfaces for the slide shoes 96. In accordance with an embodiment, shown in FIG. 11, which is intended primarily for closing units with relatively small closing force, the push rod 22 comprises two longitudinal grooves $42_1$, $42_2$ which divide the outer toothing into two rows of teeth $40_1$, $40_2$. The slide shoes $96_1$, $96_2$ are guided in guide channels in the longitudinal grooves $42_1$, $42_2$. Corresponding to the embodiment shown in FIG. 12, the push rod comprises three longitudinal grooves $42_1$, $42_2$, $42_3$ which divide the outer toothing into three rows of teeth $40_1$, $40_2$, $40_3$. The guide surfaces for the slide shoes $96_1$, $96_2$, $96_3$ are developed as flat surfaces which are at an angle of 120° to each other. The embodiment in accordance with FIG. 13 differs from the embodiment of FIG. 12 in the manner that the push rod 22 has four guide surfaces $42_1$, $42_2$, $42_3$, $42_4$ which are at an angle of 90° to each other. In accordance with FIG. 14, the outer toothing is divided by six longitudinal grooves into six rows of teeth; however only every second longitudinal groove is developed as guide surface for a slide shoe $96_1$, $96_2$, $96_3$. It is self-evident that larger closing units require more rows of teeth and slide shoes than smaller closing units do.

On the basis of FIGS. 15 to 20, the design of the pitch of the thread 36 for the taking up of the axial flank clearance S will be explained in further detail. These figures show in each case a 135° development of the outer and inner toothings of FIGS. 3 and 4. There can be noted two of the four rows of teeth of the outer toothing of the push rod 22 and one of the four rows of teeth of the inner toothing of the locking bushing 34. The teeth of the inner toothing are shown hatched. The following designations are used in the drawings andlor the following description:

P: pitch of the outer toothing on the push rod 22, or of the inner toothing on the locking bushing 34;

D: average tooth width;

S: axial flank clearance between inner toothing and outer toothing;

P': pitch of the screw thread 36 between push rod 22 and piston 28.

Figure 15:
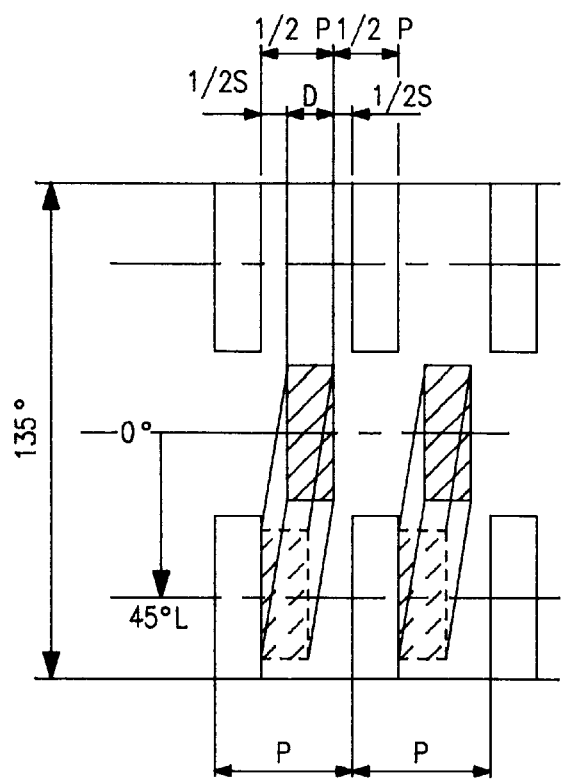
FIGS. 15 to 20 are 135° developments of the toothings on the push rod and the locking bushing.
Figure 16:
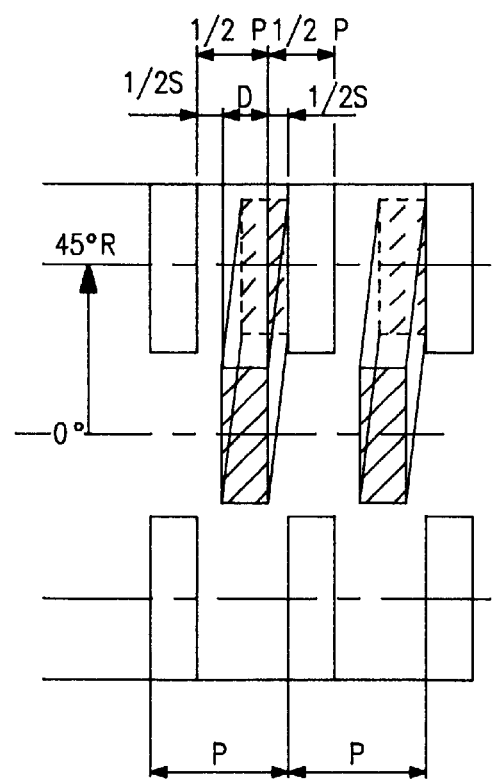
Figure 17:
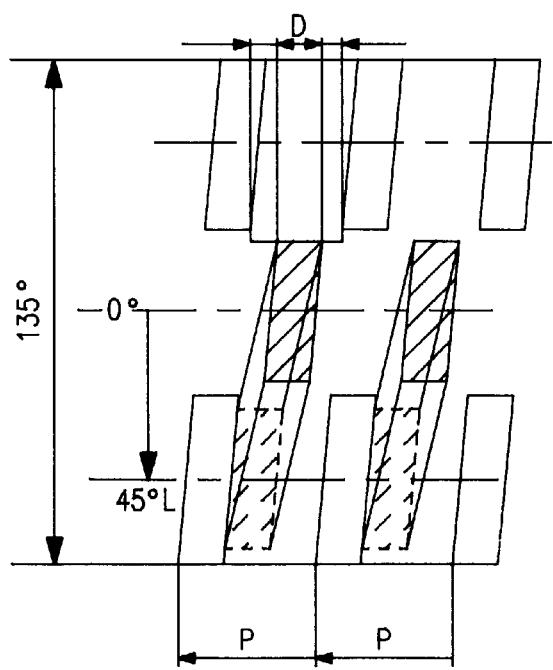
Figure 18:
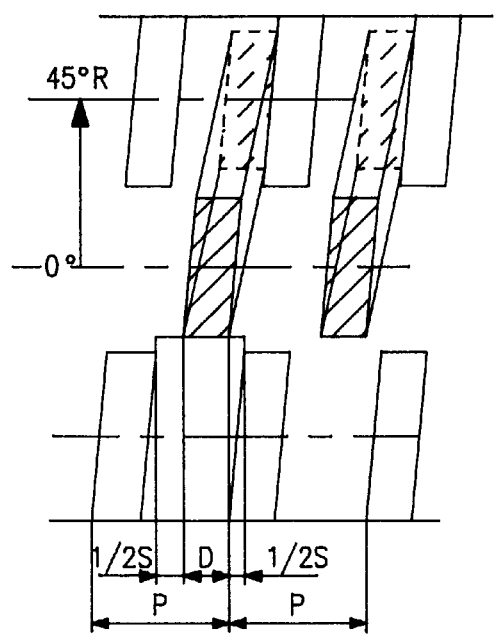
Figure 19:
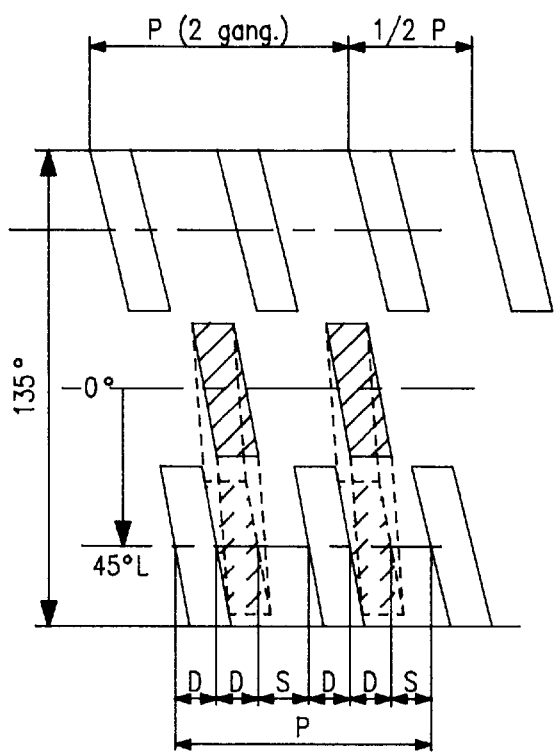
Figure 20:
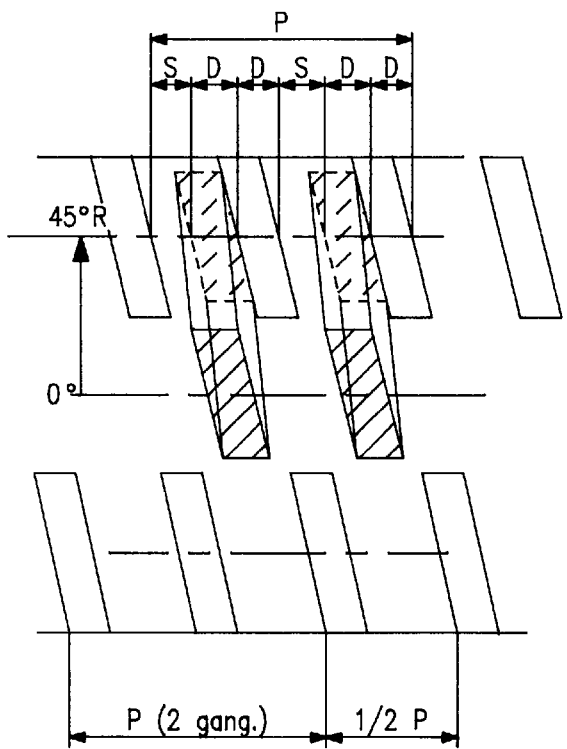

FIGS. 15, 17 and 19 show the position of the inner toothing before and after a 45° rotation of the locking bushing 34 in counterelockwise direction. Before the 45° rotation, the teeth of the inner toothing lie in a first angular position in the annular grooves between the rows of teeth of the outer toothing. After this 45° rotation in counterclockwise direction, the teeth of the inner toothing lie in a second angular position with their left flanks against the tooth of the outer toothing and can transmit a force to the left without play from the locking bushing to the push rod. FIGS. 16, 18, and 20 show the position of the inner toothing before and after a rotation of the locking bushing by an angle of 45° in clockwise direction. Before the 45° rotation, the teeth of the inner toothing lie in a first angular position in the longitudinal grooves between the rows of teeth of the outer toothing. After this 45° rotation in clockwise direction, the teeth of the inner toothing lie in a second angular position with their right flank against the teeth of the outer toothing and can transmit a force to the right without play from the locking bushing to the push rod. For the designing of the pitch of the thread 36 for the taking Up of the axial flank clearance S, it is assumed that, in the starting position, before the turning of the locking bushing, the rows of teeth of the inner toothing are in each case angularly precisely in the center between the rows of teeth of the outer toothing, and that the axial flank clearance S between inner toothing and outer toothing is divided equally on both sides.

In the general case, the pitch of the screw thread is so designed that by turning the locking bushing from the first angular position into the second angular position, the existing flank clearance S between inner and outer toothings is distributed unilaterally in such a manner that no essential flank clearance is present any longer between the tooth flanks which are to transmit force.

FIGS. 15 and 16 refer to the case of an annular toothing. The pitch of the screw thread 36 is so designed that by turning the locking bushing from the first angular position into the second angular position, the advance of the locking bushing corresponds approximately to half of the flank clearance S between inner and outer toothings, i.e.:

$$P/8=0.5\ S\ or\ P'=4\ S;$$

for the special case that S=0.5 D, i.e. S=P/5, we have accordingly:

$$P'=0.8\ P.$$

FIGS. 17 and 18 refer to the case of a helical toothing which ascends in direction of rotation of the locking bushing in the direction of the force to be transmitted. If it is assumed that the pitch P' of the screw thread is ascending also in the direction of rotation of the locking bushing in the direction of the force to be transmitted, then the advance of the locking bushing must correspond approximately to half of the flank clearance S between inner and outer toothings plus ⅛ of the pitch P of the toothing, i.e.:

$$P'/8=0.5\ S+P/8\ or\ P'=4\ S+P.$$

For the special case of S=P/5, ie. S=0.5 D, we have accordingly:

$$P'=1.8\ P.$$

FIGS. 19 and 20 refer to the case of a helical toothing which has a negative pitch in the direction of turning of the locking bushing in the direction of the force to be transmitted. Furthermore, in FIGS. 19 and 20, the toothing is developed with a double thread, i.e. S=0.5 P-2 D. If one proceeds from the basis that the pitch P' of the screw thread has a positive pitch, then the advance of the locking bushing must correspond approximately to half of the flank clearance S between inner and outer toothings minus one eighth of the pitch P of the toothing, i.e.:

$$P'/8=0.5\ S-P/8\ or\ P'=4\ S-P;$$

for the special case of S=P/10, i.e. D=P/5, we have:

$$P'=-0.6\ P.$$

The minus sign in this case means that the screw thread 36 must also have a negative pitch.

Figure 21:
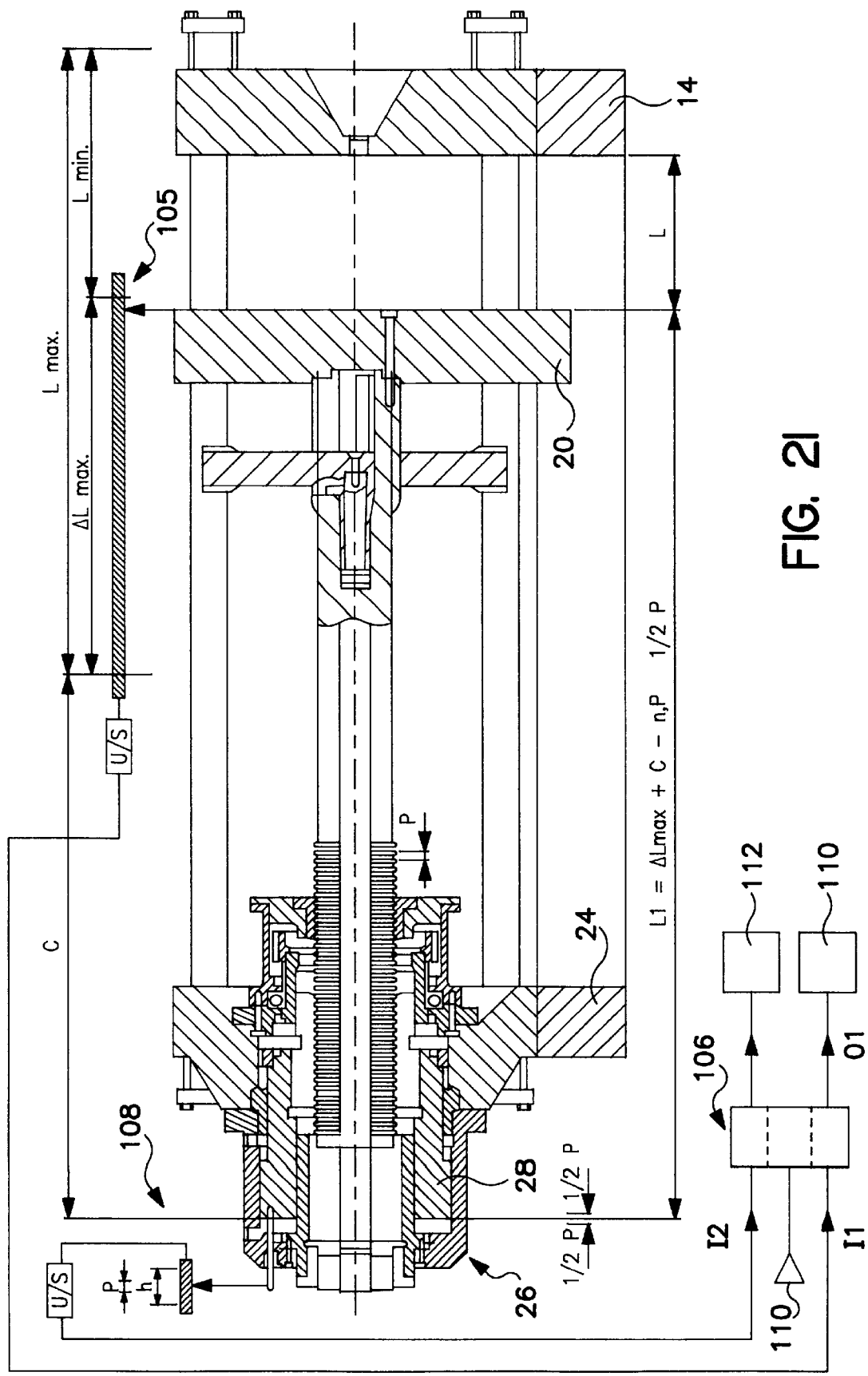
FIG. 21 is a longitudinal section through the closing unit of FIG. 1, with a diagrammatic showing of the device for the positioning of a closure plate.

FIG. 21 shows an advantageous device for optimally adapting the closing unit 10 to the length of the injection mold. The closure plate 20 is provided with a position sensor 105. A position sensor 108 is also associated with the piston 28 of the force cylinder 26. The position sensors 106 and 108 supply the input signals I1 and I2 of a digital axis control 106. Reference numeral 110 shows an input unit for the length "L" of the injection sold, i.e. the axial distance between closure plate 20 and injection plate 14. A first control unit in the axis control 106, with I1 as input signal, supplies, with O1, a control signal for the control hydraulics 110 of the displacement cylinders 25 of the closure plate 20. This control hydraulics 110 positions the closure plate 20 at a distance "L" from the fixed injection plate 14.

Before the turning of the locking bushing 34 from the first angular position into the second angular position, the teeth of the inner toothing of the locking bushing 34 should be positioned precisely axially between the teeth of the outer toothing of the push rod in order to permit the proper engagement of the inner toothing into the outer toothing. In order to make this axial positioning of the toothings possible independently of the length "L" set, the position of rest of the annular piston 28 as a function of the length "L" set is established hydraulically within a region [−0.5 P;+0.5 P] around a predetermined reference position. In other words, the locking bushing 34 is displaced axially, relative to a reference point, by an amount y, in which connection −0.5 P<y<+0.5 P. For this, a calaulating unit calculates the position of rest of the piston 28 as a function of the piston of the mating plate 20 in such a manner that, before the engagment of the inner toothing of the locking bushing into the outer toothing of the push rod, the teeth of the inner toothing lie axially between the teeth of the outer toothing. A second control unit in the axis control 106, with I2 as input signal, supplies, with O2, a control signal for the control hydraulics 110 of the force cylinder 26. This control hydraulics 110 positions the piston 28 in the calculated position of rest. The device described makes it possible, at little expense, to adjust the length "L" regardless of the pitch of the inner and outer toothings.

Referring to FIGS. 1 and 2, an advantageous embodiment of an ejection device 200 will now be described. This ejection device 200 comprises a base plate 202 which is mounted displaceably on the front end of the push rod 22 and is guided at its four corners on the four columns 17. This base plate 202 is displaceable by an ejection cylinder 204, which is integrated in the push rod 22, along this front end of the push rod 22 from a withdrawn position up to against the closure plate 20. It has several ejection pistons 206 which protrude from corresponding openings 208 (see FIG. 1) in the closure plate 20 when the plate 202 is displaced by the ejection cylinder 204 in the direction of the closure plate 20.

What is claimed is:

1. A hydraulic closing unit having an annular force cylinder for the production of a closing force, a locking bushing, an actuator for turning the locking bushing from a first angular position into a second angular position, a push rod which passes axially through the force cylinder and the locking bushing, an outer toothing on the push rod and an inner toothing in the locking bushing, this outer toothing and this inner toothing being so developed complementary to each other that in the first angular position of the locking bushing they permit an axial pushing of the push rod through the locking bushing and that, in the second angular position, the inner toothing engages in the outer toothing for the transmission of an axial force, characterized by the fact that the force cylinder is developed as a double-acting annular pressure cylinder having in each case a first pressure chamber for producing a closing force and a second pressure chamber for producing an opening force, and that a piston of said force cylinder is secured against rotation and is coupled via a screw thread to the locking bushing.

2. A closing unit according to claim 1, wherein the actuator is designed to turn the locking bushing by an angle γ on both sides to the first angular position, the locking bushing experiencing an advance+x or−x relative to the piston.

3. A closing unit according to claim 1, wherein the pitch of the screw thread is designed in such a manner that by turning the locking bushing from the first angular position into the second angular position, an existing flank clearance S between inner toothing and outer toothing is distributed unilaterally in such a manner that no substantial flank clearance is present any longer between the tooth flanks which are to transmit force.

4. A closing unit according to claim 1, wherein the teeth of the inner and outer toothing are arranged annularly.

5. A closing unit according to claim 3, wherein the teeth of the inner and outer toothing are arranged annularly and the pitch of the screw thread is so designed that by turning the locking bushing from the first angular position into the second angular position, the advance of the locking bushing corresponds approximately to one half of the flank clearance S between inner and outer toothings.

6. A closing unit according to claim 1, wherein the inner and outer toothings form a thread which, in the direction of rotation of the locking bushing, has a positive pitch P in the direction of the force to be transmitted.

7. A closing unit according to claim 6, wherein the pitch of the screw thread is so designed that by turning the locking bushing by an angle γ from the first angular position into the second angular position, the advance of the locking bushing corresponds approximately to one half of a flank clearance S between the inner and outer toothings plus (γ/360°) P.

8. A closing unit according to claim 1, wherein the inner and outer toothings form a thread which, in the direction of rotation of the locking bushing, has a negative pitch P in the direction of the force to be transmitted.

9. A closing unit according to claim 8, wherein the pitch of the screw thread is so designed that by turning the locking bushing from the first angular position into the second angular position the advance x of the locking bushing corresponds approximately to one half of a flank clearance S between inner and outer toothings minus (γ/360°) P.

10. A closing unit according to claim 6 in which the thread of the inner and outer toothings is a double thread.

11. A closing unit according to claim 1, wherein the locking bushing is so arranged on the piston of the force cylinder that it is under compressive stress upon transmission of the closure force.

12. A closing unit according to claim 11, wherein the push rod has an elastic limit which is about 20% higher than that of the locking bushing, the push rod and locking bushing being so designed that they have approximately the same cross section.

13. A closing unit according to claim 11, wherein the length of the base of a tooth of the inner toothing is equal to the length of the base of a tooth of the outer toothing.

14. A closing unit according to claim 11, wherein the teeth of the inner toothing have a smaller flank surface than the teeth of the outer toothing, and the teeth of the outer toothing are of greater hardness than the teeth of the inner toothing.

15. A closing unit according to claim 1, wherein the teeth of the inner toothing and the teeth of the outer toothing have a trapezoidal cross section.

16. A closing unit according to claim 1, wherein the inner toothing and the outer toothing are divided by longitudinal grooves into at least two rows of teeth in such a manner that, in the first angular position, the rows of teeth of the outer toothing can be passed through axially by the longitudinal grooves of the inner toothing and the rows of teeth of the inner toothing can be passed through axially by the longitudinal grooves of the outer toothing and thus permit an axial passage of the push rod through the force cylinder and the locking bushing, and that, in the second angular position, the teeth of the inner toothing engage behind the teeth of the outer toothing for the transmission of an axial force.

17. A closing unit according to claim 16, further having slide shoes as radial guidance for the push rod, the longitudinal grooves in the outer toothing of the push rod being developed as guide surfaces for these slide shoes.

18. A closing unit according to claim 1, wherein the actuator has a rack for the displacement of the angular position of the locking bushing.

19. A closing unit according to claim 18, wherein the rack has a cylindrical bore at each of its ends, a respective fixed piston is received by each of the two cylinder bores so that the rack is displaceable axially back and forth between the two fixed pistons, and the two cylinder bores can be acted on by a pressurized fluid behind the fixed pistons to provide two oppositely acting pressure cylinders for the displacement of the rack.

20. A closing unit according to claim 19, wherein each said fixed piston has a connecting channel extending axially therethrough for transmitting said pressurized fluid to said bores.

21. A closing unit according to claim 18, further having a drive bushing with outer toothing which engage in form-locked manner the teeth of the rack, the drive bushing being rotatably mounted in a housing, and coupling means for the form-locked transmission of a moment of rotation from the drive bushing to the locking bushing, said coupling means permitting axial displacement of the locking bushing relative to the drive bushing.

22. A closing unit according to claim 21, wherein the coupling means are developed as tooth or spline-shaft connection.

23. A closing unit according to claim 1, further having a control unit for the axial positioning of the piston of the force cylinder in a position of rest which is so calculated that, upon the turning of the locking bushing from the first angular position into the second angular position, the teeth of the inner toothing lie axially between the teeth of the outer toothing.

24. A closing unit according to claim 1, further having a closure plate which is mechanically connected with the push rod, a displacement device for the displacement of the closure plate, a position sensor for the closure plate, a position sensor for the actual position of the piston of the force cylinder, a calculating unit for calculating the position of rest of the piston as a function of the measured position of the closure plate, in such a manner that, before the engagement of the inner toothing of the locking bushing into the outer toothing of the push rod, the teeth of the inner toothing lie axially between the teeth of the outer toothing, and a control unit having the measured value of the position sensor of the piston as an input signal for positioning the piston in the calculated position of rest.

25. A closing unit according to claim 1, further having an ejection device having a base plate which is mounted displaceably on the front end of the push rod and is guided at its four corners on the four columns, a plurality of ejection pistons on the base plate, and an ejection cylinder which is integrated in the push rod.

26. A closing unit according to claim 3, wherein the inner and outer toothings form a thread which, in the direction of rotation of the locking bushing, has a positive pitch P in the direction of the force to be transmitted.

27. A closing unit according to claim 26, wherein the pitch of the screw thread is so designed that by turning the locking bushing by an angle γ from the first angular position into the second angular position, the advance of the locking bushing corresponds approximately to one half of the flank clearance S between the inner and outer toothings plus (γ/360°) P.

28. A closing unit as claimed in claim 3, wherein the inner and outer toothings form a thread which, in the direction of rotation of the locking bushing, has a negative pitch P in the direction of the force to be transmitted.

29. A closing unit according to claim 28, wherein the pitch of the screw thread is so designed that by turning the locking bushing from the first angular position into the second angular position the advance x of the locking bushing corresponds approximately to one half of the flank clearance S between inner and outer toothings minus $(\gamma/360°)$ P.

* * * * *